Patented Apr. 5, 1927.

1,623,513

UNITED STATES PATENT OFFICE.

HANS WEIDMANN, OF FRANKFORT-ON-THE-MAIN, GERMANY, ASSIGNOR, BY MESNE ASSIGNMENTS, TO ALLIED PROCESS CORPORATION, OF NEW YORK, N. Y., A CORPORATION OF NEW YORK.

PROCESS FOR THE PREPARATION OF LITHIUM CARBONATE.

No Drawing. Application filed May 12, 1926, Serial No. 108,691, and in Germany May 29, 1925.

In the production of lithium salts by the decomposition of lithium containing minerals such as lepidolite, amblygonite, and the like with alkali metal sulfates and bisulfates it is possible to obtain solutions containing lithium sulfate and potassium sulfate and substantially free of all other salts. The recovery of lithium by precipitating it as the carbonate from such solutions involves technical difficulties in that only from 30 to 60 per cent of the lithium precipitates depending upon the concentration of the solution treated and the precipitate contains a relatively large amount of sulfate which is very difficult to remove by washing which incidentally dissolves a relatively large amount of the lithium carbonate.

It has already been proposed to avoid this difficulty by the preliminary removal of potassium sulfate by means of ammonia, but this process is objectionable on account of the difficulties involved in the handling of concentrated ammonia solutions or gaseous ammonia and the uneconomical recovery of the ammonia.

It has now been found that the potassium sulfate can be easily removed by salting it out with potassium salts such as the chloride. By treating a solution of potassium and lithium sulfates with potassium chloride, potassium sulfate is precipitated leaving a solution of potassium and lithium chlorides in which the sulfates are only sparingly soluble.

From the resulting solution which is free of potassium sulfate but concentrated with respect to lithium chloride, lithium carbonate of high purity and in good yield is precipitated by, for instance, the addition of potassium carbonate. At the same time potassium chloride is regenerated and the mother liquor of the lithium carbonate precipitation can be used for the precipitation of potassium sulfate from a subsequent batch of potassium sulfate—lithium sulfate solution. The small amount of lithium which is not precipitated as carbonate and remains in the mother liquor is thus returned to the process and eventually recovered so that the yield of lithium from the potassium sulfate—lithium sulfate solution in continuous operation is practically quantitative or 100 per cent of the theoretical.

Example:

To a solution containing 90 grams of potassium sulfate and 75 grams of lithium sulfate per liter there is added 280 grams of potassium chloride per liter of the solution. The resulting precipitate of potassium sulfate is separated by filtration and 94 grams of potassium carbonate are added to each liter of the filtrate. The resulting precipitate of lithium carbonate amounting to 42 grams per liter of solution treated amounts to 86 per cent of the theoretical yield and is separated by filtration, the mother liquor containing principally potassium chloride being used in the treatment of a subsequent batch of solution. The lithium carbonate precipitate so obtained contains 99.3 per cent of $Li_2CO_3$ and about 0.01 per cent of chlorine.

I claim:

1. Process which comprises adding potassium chloride to a concentrated aqueous solution of potassium sulfate and lithium sulfate, separating the potassium sulfate so precipitated, and precipitating the lithium content of the solution as lithium carbonate.

2. Process which comprises adding potassium chloride to a concentrated aqueous solution of lithium sulfate and potassium sulfate, and separating the potassium sulfate thereby precipitated from the solution.

3. Process which comprises adding potassium chloride to a concentrated aqueous solution of potassium sulfate and lithium sulfate, separating the potassium sulfate thereby precipitated from the solution, adding potassium carbonate to the solution, and separating the lithium carbonate thereby precipitated from the solution.

In testimony whereof, I affix my signature.

HANS WEIDMANN.